Sept. 28, 1971 J. R. PAYSINGER ET AL 3,608,406

APPARATUS AND METHOD FOR FORMING PRECISION SURFACES ON ENDS OF PIPES AND ANALOGOUS ANNULAR SURFACES

Filed July 9, 1968

INVENTORS
JOSEPH R. PAYSINGER
EUGENE F. SIMS
JEROME W. NELSON

BY

Edwin M. Thomas ATTORNEY

United States Patent Office 3,608,406
Patented Sept. 28, 1971

3,608,406
APPARATUS AND METHOD FOR FORMING PRECISION SURFACES ON ENDS OF PIPES AND ANALOGOUS ANNULAR SURFACES
Joseph R. Paysinger, Eugene F. Sims, and Jerome W. Nelson, Houston, Tex., assignors to CRC-Crose International, Inc.
Filed July 9, 1968, Ser. No. 743,566
Int. Cl. B23b 1/00
U.S. Cl. 82—1                           8 Claims

ABSTRACT OF THE DISCLOSURE

For forming precision shaped surfaces on the ends of large steel pipe and analogous annular structures, a rotating face plate is supported adjacent the end of the annular member and aligned with the end surface by means of an internal clamp which fits into the annular member. This holds the face plate in predetermined aligned position. Cutting tools are supported on holder elements which are resiliently mounted and include means for rolling contact with the internal surface of the annular member. In this way a true and uniform surface configuration is obtained on the pipe end, regardless of minor eccentricity or other deviations from a true circular form.

BACKGROUND AND PRIOR ART

In forming the end surface of large steel pipe and analogous members, considerable difficulty has been encountered in obtaining accurate alignment. Precise alignment is often required for such precision operations as the automatic welding of girth joints in large pipelines and the like. As a rule, the work of end surface preparation is done in large machine shops involving heavy and massive equipment. An example of a prior art pipe end finishing machine is shown in U.S. Pat. No. 3,103,140 to Connelly. Massive means are required for holding the work pieces, e.g. large pipes, firmly and accurately while the machining is done on their end surfaces. Even after pipe ends are carefully machined in the shop, however transportation to the field frequently results in denting, bending or other distortions which may throw the end surface out of the true plane required for precision welding operations and for related or analogous operations.

There is a need, therefore, for a relatively simple, lightweight, and portable apparatus for finishing the ends of pipes in the field. Such is desirable to obtain the required specially shaped surfaces or bevels, etc. needed for forming high quality welds which are essential for gas lines, oil lines and other large pipelines.

An important object of the present invention is to design an apparatus that can accomplish precision end shaping satisfactorily and which at the same time is relatively light in weight. The apparatus is readily portable and is still rugged enough for use and transportation under rough field conditions.

Various methods and apparatus have been proposed in the past for cutting pipe ends in the field. Cutting has been accomplished by torches, for example, but the results are very rough. None of the prior art field cutting or shaping techniques, as far as applicants are aware, is satisfactory for the present purposes. A particular object of this invention is to combine with a more or less conventional pipe clamping mechanism, as used in pipeline construction, the requisite mechanisms. These include cutting means operable for forming the desired surface or shape on the end of the tubular member. The invention also has method aspects, inasmuch as other types of apparatus capable of accomplishing the same result may be readily envisioned once the principles of this invention are understood.

DESCRIPTION OF PREFERRED EMBODIMENT

Figures 1, 2, 3:
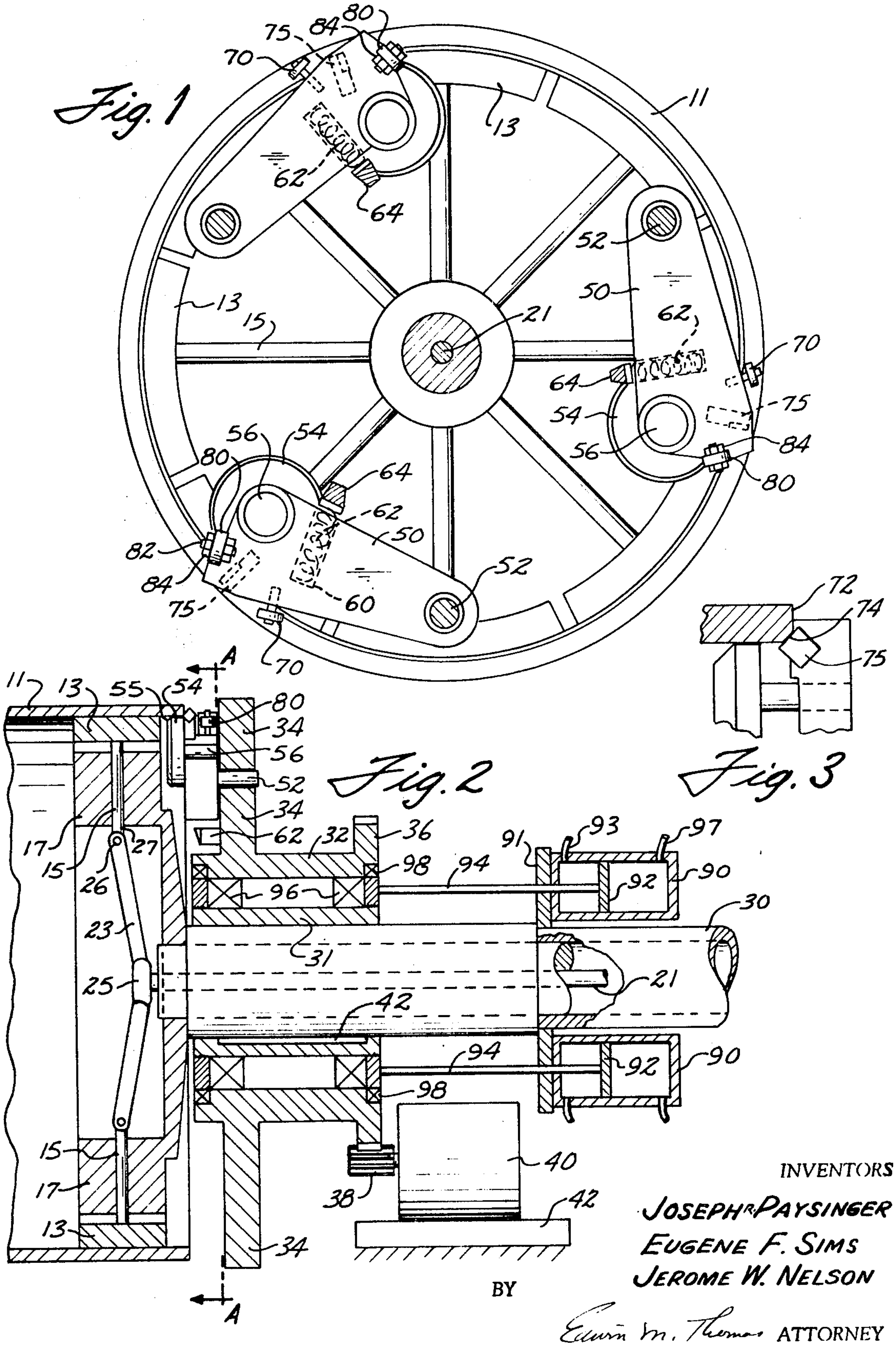
FIG. 1 is a transverse view, partly in section, taken substantially along the line A—A of FIG. 2, looking in the direction of the arrows.
FIG. 2 is a fragmentary longitudinal sectional view of apparatus embodying the invention.
FIG. 3 is a small detail on a larger scale, showing certain cutter and alignment or positioning elements of the invention.

Referring first to FIGS. 1 and 2, the apparatus of the present invention is seen as comprising an assembly of parts designed for holding a large, tubular member, such as a pipe, while forming a desired shape or profile on its annular end surface. Such annular member, typically large steel pipes, are widely used in construction of large pipelines, e.g. for transmission of natural gas, liquid petroleum and its products, and other valuable materials. The member 11 may, for example, be a steel pipe of from 30 to 48 inches in diameter or larger. A typical pipe of the sort for which the present invention is particularly suitable, frequently will be about 30, 36 or 42 inches in diameter.

A more or less conventional internal pipe clamping machine is shown, in part, as comprising a set of pipe wall engaging clamping shoes 13. These shoes are arranged in a clamp frame, not shown in detail, to extend around the axis of the pipe so as to grip its interior surface when moved to their radially outward positions. Each pipe clamping shoe 13 is supported on a radially extensible rod 15 which is guided, as seen best in FIG. 2, through one or more guiding ring members 17 of annular shape. The rods 15 may be moved out to clamping position or drawn in to release position by any suitable operating means, such as structure operated by cams, toggles, etc. By way of example, a toggle means, consisting of a longitudinally movable central shaft 21, is shown which, upon axial movement either to right or left, as seen in FIG. 2, tends to operate to move toggle rods or bars 23. These are connected at their inner ends to a central hub member 25 fixed to the shaft 21. Each of these toggle links 23 is pivotally connected at 26 to a radially slidable operating clamp rod 15, each of which carries one of the clamp shoes 13. Obviously, when the shaft 21 is moved to the left, as seen in FIG. 2, the clamp shoes are tightened. When shaft 21 is retracted towards the right, the clamp shoes are released from clamping position. Other types of toggle mechanism or cams, etc., can be used to operate and release the clamping shoes, as is well known in the art. The rod 21 may be operated by any suitable means, such as hydraulic or mechanical elements, not shown in the drawings. While only one ring of clamping shoes is shown, the clamp may use plural sets spaced along the length of the pipe. The clamping mechanism per se is quite conventional and its detailed elements form no part of the present invention. However, its frame is modified or adapted in the present case to support the requisite alignment and operating elements which serve to machine the pipe ends to the desired shape, as will next be described.

The principal support element for the end forming mechanism, as shown in the attached drawings, comprises a main and non-rotatable hollow shaft 30. On this shaft is slidably mounted and keyed a non-rotating sleeve 31. The latter supports for rotation a shell or spider member 32. Spider 32 is integral with or attached by a face plate 34. A gear 36 also is formed integrally with the spider member 32 which gear is designed to be driven in rotation around sleeve 31 and shaft 30 by the small elongated spur gear 38 of an electric or hydraulic or other motor 40. This motor is supported by a fixed element 42 attached to a suitable part of the main clamp frame apparatus, not shown in detail.

The spider 32 rotates on sleeve 31, being supported on antifriction bearings 96. Sleeve 31 is secured against rotation with respect to shaft 30 through a key 42, it being understood that the sleeve 31 and the spider 32, etc., can slide along the shaft. Mounted on the left side of the face plate 34 are a plurality, preferably three arms 50, each pivotally supported on a pin 52 secured to the face plate. These pivotally mounted arms each can rock about their pivot pin 52 which constitutes their support on face plate 34. Each arm 50 carries a cutter guiding and positioning roller 54 supported on a shaft 56 mounted near the opposite end of arm 50 remote from the pivot 52. These rollers 54 are freely rotatable on their shafts 56 and are adapted to fit inside and roll around the inner surface of pipe 11, the end surface of which is to be machined to the desired shape or profile.

Each arm 50 is provided with a recess 60 in which is set a strong compression spring 62. Each spring 62 is adapted to seat against an abutment member 64 which is attached to the face plate 34. The arrangement is such that the rollers are normally urged radially outward away from the central hollow shaft 30. A limit stop 70 is provided for each arm 50 to limit to the extent to which the arms 50 and the rollers 54 can swing away from the center of the pipe. The main purpose of these arms is to carry cutting elements to machine the end of the pipe to the desired shape. The purpose of rollers 54, which also are associated with the cutting devices, which actually cut or shape the pipe ends, is to assure that the surface will be accurately machined all around the annular pipe end in a predetermined relationship to the inner periphery of the pipe.

The reason for requiring the accuracy and relationship just mentioned is that pipes of the type described frequently are somewhat out of round or oval in form. Although a strong clamping device, such as that shown and partially described above, tends to bring the pipe back into true circular configuration, it may not actually be quite circular under some conditions. To form a sound weld by automatic means requires that the profile be the same all around the joint. When the pipe is to be machined with a profile which includes, by way of illustration, a perpendicular end surface element 72, FIG. 3, in combination with a narrow bevel element 74, it is obviously important that the width of the bevel element and of the perpendicular land surface 72 be substantially uniform all the way around the pipe end. Hence, as the rollers 54 are designed to move around the inside of the pipe, the machining or cutter elements 75, as shown in larger view in FIG. 3, see also FIG. 1, are arranged to cut exactly the profile required all around the end surface. While all arms 50 may carry identical cutters 75, it is usually preferred to have a different cutter on each arm to cut a selected part of the contour desired.

Each arm 50, in addition to the rollers 54 and cutters 75 previously mentioned, carries a transversely mounted backing roller 80. This roller, in each case, is mounted on an axle 82 supported in suitable bearings 84 fastened to the arm 50. These rollers 80 then contact the face plate 34, as shown in FIG. 2, so that as the face plate is moved towards the pipe the rollers 54, which the arms 50 carry, will be forced into the end of the pipe. Each roller 54 has a beveled outer or front surface 55 which facilitates the operation of forcing the roller into the end of the pipe. This requires rocking each arm 50 against the force of its compression spring 62.

The rollers 54, and the arms 50 which support them, are forced into operating position by face plate 34. A pair of hydraulic cylinders 90 is mounted on a fixed support member 91, each having a piston 92 connected by a piston rod 94 to a ring 95 which is attached to sleeve 31. By reason of bearings 96, which serve as thrust bearings as well as giving rotational support, spider 32 is forced ahead by pistons 92.

The controls for the hydraulic cylinders and pistons 90, 92 are not shown. It will be obvious that the lines 93 and 97 are connected to a suitable hydraulic pump or other prime mover, e.g. motor driven screw, so that the pistons may be moved in or out in unison to advance or retract the face plate 34 with its attached arms 50 and the follower and machining, cutting or grinding elements. Further description appears to be unnecessary.

It will be understood that the spider member 32 rotates around the central shaft 30 and also around the clamp actuating shaft 21 within shaft 30. Bearing seals are provided, as shown at 98. It will be noted that the spur gear 38, which drives the spider and face plate, is elongated so that regardless of the longitudinal position of the larger gear 36 and spider 32, the gears will remain in mesh and thus face plate 34 will be driven by the motor whenever motor 40 is operated.

To summarize, as the apparatus is to be used, the clamping structure 13, etc., is placed within the pipe 11 which is to be machined on its end surface. After the clamp has been inserted a suitable distance, the clamp shoes 13 are operated by moving rod 21, by hydraulic means or other suitable power, not shown, to expand them into tight clamping position. Thereafter, the hydraulic pistons 92 are operated to push the sleeve 31, and the spider 32 to the left, FIG. 2. This forces the rollers 54 to move inside the pipe, swinging arms 50 radially inward against the resistance of compression springs 62 These are strong springs and they assure that the rollers 54 will fit tightly against the inner surface of the pipe at a point near its forward end. The apparatus is pushed into the pipe until a gauge or stop position is reached. The spider is then rotated by the motor 40 to machine the surface, the cutter elements 75 of course being shaped and preground to cut the desired profile or configuration on the end of the pipe. A metering device, not shown, advances the cutters as metal is removed. If desired, one or two cutters can be shaped to cut one part of the profile and the other two or one can be shaped to cut the remainder.

The rollers 80 are forced ahead by pushing as the face plate 34 rotates, the arms 50 being pivoted at points radially inside the pipe wall and carrying the cutters 75 ahead and moving clockwise as seen in FIG. 1 and the guiding rollers 54 which are thereby urged radially outward by the force of the inherent moment or couple between the pivots and the inside surface of the pipe. Arms 50 are insertable inside the pipe to swing in and out as required. Since the cutters are associated with these rollers, they follow the contours of the pipe even though the pipe is somewhat out of round. As a result, each element of the end surface profile, the bevel face portion 74, is of uniform width around the periphery of the pipe, as are also all other elements such as the perpendicular surface 72. This assumes that the pipe wall is of uniform thickness. If the pipe has spots or portions that are thicker or thinner than others, the width of an element of the surface 72 may be varied slightly without detriment to the formation of a good weld.

It will be understood that the exact configuration of the end surface or profile can be varied as desired since the cutters 75 can be ground or shaped, and/or positioned on the arms 50 in the desired combination or shaping to obtain any desired configuration.

The apparatus just described has been found to be particularly useful for its purpose. The association of the guided cutters on a rigid face plate operatively associated with a firm clamp provides a solid mounting that can be used in the field. The apparatus is light in weight, considering its rigidity, and its mounting, with respect to the pipe, facilitates rapid as well as accurate machining.

It will be obvious that various modifications may be made in the details of the equipment without departing from the spirit of the invention. Processwise, the invention involves an improved method for machining relatively narrow annular surfaces on hollow tubular members with a high degree of accuracy. Using an internal clamp for primary alignment and employing surface-follower rollers 54, or equivalent, for guiding each cutter as it passes around the surface to be machined gives firm control over each cutter element. This makes it possible to maintain high accuracy in the width and dimensions of the various cuts or formed elements of the end surface.

Obviously, if desired, the follower 54 or equivalent, which is kept resiliently forced against a cylindrical surface of the pipe or other annular body, can be held against an outside surface, if desired. Also, while a rotating follower is preferred, a sliding follower may be used in its place, at least in some cases. Also, in lieu of cutting tools, the machining or shaping elements may be grinding tools, rotatable individually by conventional means or fixed to rotate with arms 50, etc., as will be obvious.

As pointed out above, this type of machining, usable in the field under pipeline laying conditions, for example, provides an end surface accuracy which greatly facilitates the automatic welding of large pipelines. Such hitherto has not been commercially practical as far as the inventors are aware.

It is intended by the claims which follow to cover the invention described and all obvious variations and modifications thereof, which would occur to those skilled in the art, as broadly as the prior art properly permits.

What is claimed is:

1. The method of machining the annular end of a large pipe or like annular object in the field which comprises, in combination, the steps of clamping an axle member firmly to said pipe, in accurate alignment with the axis of said pipe while holding the pipe end in substantially circular shape, rotating a carrier about said axis and in a plane substantially parallel to but outside the end of said pipe, mounting a cutter tool for operation on the annular pipe end and a closely associated follower on said carrier through support arm means pivoted to said rotating carrier outside the pipe for permitting radial movement of the tool and follower with respect to said axis, resiliently forcing said tool and follower radially outwardly with respect to said axis to hold said follower against the inner pipe surface while rotating said carrier in a direction to push the cutter in its cutting operation, the support arm being pivoted to the carrier in such a manner as to provide a radial moment of force further tending to hold the follower firmly against the inner surface of said pipe, thereby to maintain close and accurate control over said cutter and causing the cutter to follow accurately the profile of said pipe end including deviations of the annular pipe end from truly circular configuration.

2. In apparatus of the character described, the combination which comprises a clamp for firmly engaging a generally cylindrical surface of an annular work member such as a large diameter pipe and the like, said clamp including work engaging elements mountable to said work member and adapted to round said work member out to substantially circular configuration with only minor deviations from true circular form, said clamp also including axle means supported along the axis of said annular work member, a face plate precision mounted on said axle means and outside of the work member for rotation in a plane substantially parallel to an annular end surface of said work member, means for firmly pressing said work engaging means against a cylindrical surface of said work member, at least one arm pivotally supported on said face plate and projecting from its pivot in a direction to intersect a cylindrical surface in extension of a surface of said annular work member, a machining means carried by said arm and adapted to perform a machining operation on an annular end surface of the work member, a roller-follower also carried by said arm in close proximity to said machining means and adapted to engage a cylindrical surface of the work member close to the annular end surface being machined so as to guide the machining means accurately with respect to said engaged cylindrical surface, thereby to insure that the machining means will conform to said minor deviations from true circular, resilient means for urging the arm about its pivot in a direction to hold said roller-follower against said engaged cylindrical surface, and the point of pivoting of the arm to the face plate being so located as to provide a moment of force resultant from reaction of the machining means engaging said annular end surface of the work member to reinforce the action of said resilient means during a machining operation.

3. Combination according to claim 2 wherein the maching means is a cutter.

4. Combination according to claim 3 adapted particularly for machining accurately the end of a large diameter pipe which is deformable out of a true circle, wherein a plurality of followers and cutters are provided, each individual cutter being associated with a follower on a separate rockable arm, and compressed spring means supported by the face plate for resiliently holding said rockable arm radially outward with the follower in contact with the said internal surface of the pipe.

5. Combination according to claim 2 which comprises a hollow tubular support through which said clamp expansion means operates, bearing means surrounding said support and suporting a rotatable sleeve or spider on said tubular support, the face plate being mounted on said sleeve or spider, and a plurality of cutter-carrying rocker arms attached to said face plate.

6. Combination according to claim 5 wherein the spider also carries a driven gear for operating said face plate and cutters.

7. Combination according to claim 5 wherein each rocker arm carries a rotatable contact roller for following the cylindrical surface and wherein each arm is backed by resilient means disposed between the face plate and the arm to force the follower against said cylindrical surface.

8. In apparatus as described in claim 2, the combination wherein the clamp is internal and its operating means project through the face plate, and wherein the face plate is driven by means surrounding said clamp operating means.

References Cited

UNITED STATES PATENTS

| | | | |
|---|---|---|---|
| 1,674,372 | 6/1928 | Nonneman | 82—4.3 |
| 3,075,412 | 1/1963 | Kushmur et al. | 77—2 |
| 3,103,140 | 9/1963 | Connelly | 82—2.6 |

LEONIDAS VLACHOS, Primary Examiner

U.S. Cl. X.R.

82—4C